Figure 1:
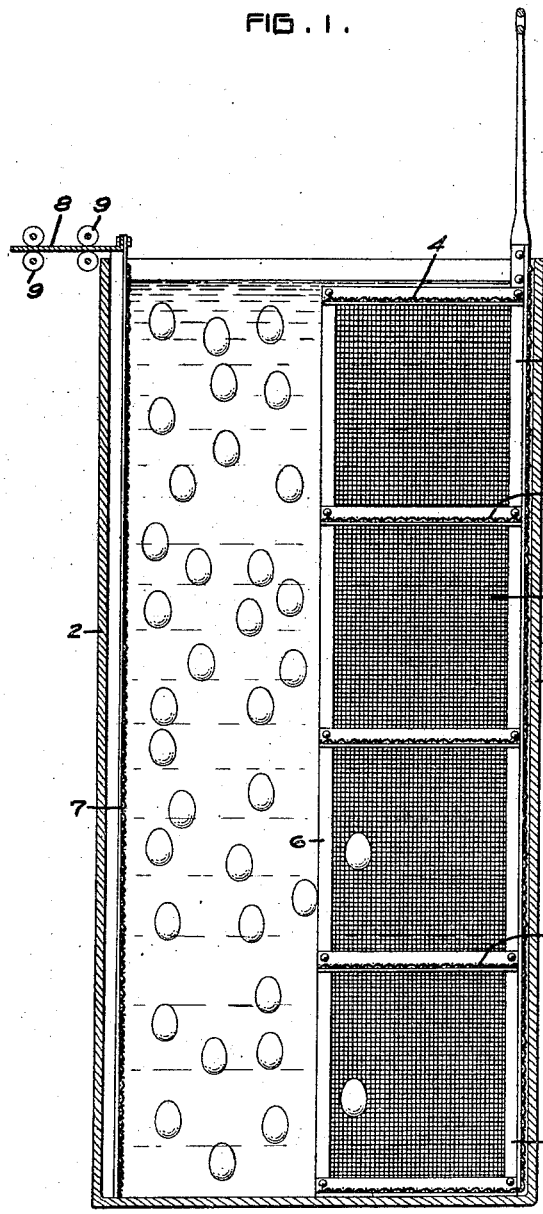

Nov. 25, 1924.

M. KASSER 1,516,738

PROCESS OF AND APPARATUS FOR GRADING EGGS

Filed March 24, 1923

WITNESS:
H. Sherburne.

INVENTOR
Morris Kasser.
BY White Prost Evans
his ATTORNEYS

Patented Nov. 25, 1924.

1,516,738

UNITED STATES PATENT OFFICE.

MORRIS KASSER, OF SAN FRANCISCO, CALIFORNIA.

PROCESS OF AND APPARATUS FOR GRADING EGGS.

Application filed March 24, 1923. Serial No. 627,321.

*To all whom it may concern:*

Be it known that I, MORRIS KASSER, a citizen of the United States, and a resident of the city and county of San Francisco, State of California, have invented a certain new and useful Process of and Apparatus for Grading Eggs, of which the following is a specification.

The invention relates to a process of and an apparatus for grading eggs in accordance with the keeping qualities of the eggs. I have determined that the keeping qualities of the eggs may be readily determined without in any way injuring the eggs. I have found that the eggs of lesser specific gravity have the poorer keeping qualities, and that the keeping qualities of the egg increase as the specific gravity of the egg increases, and that the eggs of greater specific gravity have the better keeping qualities. By grading the eggs in accordance with their keeping qualities, those eggs which have the poorer keeping qualities may be immediately used and those which have the better keeping qualities may be kept in storage and their use deferred without the liability of the eggs becoming spoiled.

An object of my invention, therefore, is to provide a process of and an apparatus for grading eggs in accordance with their specific gravity.

Another object of the invention is to segregate the eggs into grades in accordance with their keeping qualities so that eggs of various keeping qualities will not be mixed, thereby enabling the merchant to first dispose of those eggs having the poorer keeping qualities so that they may be used while they are still in perfect condition and retaining those eggs which will remain in perfect condition for a longer time.

The invention possesses other advantageous features, some of which, with the foregoing, will be set forth at length in the following description, where I shall outline in full that form of the process of my invention and that form of the apparatus which I have selected for illustration in the drawings accompanying and forming part of the present specification. In said drawings I have shown one specific form of the apparatus of my invention but it is to be understood that I do not limit myself to such form, since the invention, as set forth in the claims, may be embodied in a plurality of forms.

Figure 2:
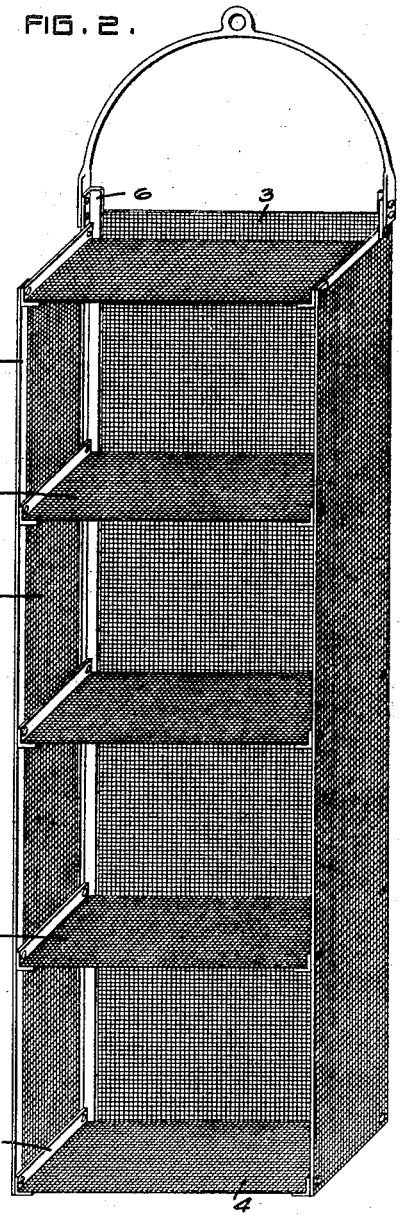

Referring to said drawings:

Figure 1 is a vertical section through one form of apparatus embodying my invention; and Fig. 2 is a perspective view of the receptacle into which the graded eggs are moved.

In accordance with my invention, I provide a deep receptacle 2 containing liquid into which the eggs are introduced at the surface of the liquid. The depth of the liquid is preferably such that only the eggs having the better keeping qualities will sink to the bottom of the liquid. The depth of the receptacle is also controlled by the specific gravity of the liquid employed and I find that a receptacle of approximately ten feet in depth is sufficient to answer all practical purposes. The liquid employed may be water or an aqueous solution or may be oil, or other liquid.

The eggs are introduced into the liquid and sink to various depths of the liquid depending upon the specific gravities of the eggs, the eggs having the greatest specific gravity sinking to the lowest position. Due to the fact that the liquid has a great depth as compared with the eggs, a comparatively fine gradation as regards specific gravity is obtained. In fact, there is such a wide separation between the eggs of the various grades that it is entirely practicable to grade a large number of eggs simultaneously, since each grade corresponds to a substantial height of the liquid, and it is a simple matter to segregate the grades by the use of a vertical series of horizontal dividing planes. If a column of liquid of materially shorter height be used, then the segregation of the grades becomes impossible, since they would overlap to a great extent, by the existence of many eggs occupying intermediate positions. On the other hand, with my device, very few eggs are apt to overlap the grades. I prefer to introduce a layer of eggs at a time,—that is a layer taken from the egg box, and comprising three dozen eggs and these eggs will sink to different zones in the liquid, depending upon their specific gravities. The eggs in the different zones are then collected so that segregated grades of eggs of different keeping quality are obtained. The eggs may be segregated and collected in any desirable manner. In the drawings, I have shown an egg receiving receptacle which is placed in the liquid receptacle at one side thereof and which is open on the side facing the unobstructed liquid column in which the eggs settle. This egg receiving receptacle comprises preferably an elongated box 3 having horizontal partitions 4 which serve to divide the liquid into vertically spaced zones. The box 3 lies to one side of the liquid containing receptacle 2 and is open on the side facing the liquid column in which the eggs settle so that the eggs may be moved from the column into the compartments of the box. The box and the shelves therein are preferably formed of screen or other foraminous material, so that the liquid drains from the box as the box is raised from the liquid receptacle. The box preferably comprises a metallic frame 6 on which the screen is stretched. Means are also provided for moving the suspended eggs into the box. In the apparatus shown in the drawing, this means comprises a transversely movable foraminous wall 7 which normally lies against the side of the receptacle 2 remote from the box. After the eggs have been introduced and reached a stable condition in the liquid the wall 7 is moved transversely to push the eggs into the box, the eggs being disposed in the box in the different compartments therein, in accordance with their specific gravities. The box is then raised from the liquid, thus removing the eggs in segregated groups. The wall 7 may be supported upon a longitudinal rail 8 which is guided between rulers 9 so that the wall will move transversely while maintaining its vertical position.

The eggs may be graded either before or after being processed. By processing, I mean the treating of the egg to increase its keeping quality and this processing is done in many ways, such for instance as submerging the egg in hot oil. When desired, the egg may be processed at the same time that it is graded, and this may be accomplished by employing oil as the grading liquid and by maintaining the upper zone of the oil hot,—that is at about 200° Fahrenheit,—so that as the eggs sink through this upper layer they are processed by contact with the hot oil.

It is to be understood that the apparatus shown in the drawings is quite crude and that other and more economical forms of the apparatus may be employed for segregating the eggs into groups in accordance with their keeping qualities.

I claim:

1. The method which comprises depositing a number of eggs into a deep body of liquid of such density that a fresh egg sinks substantially to the bottom, and segregating the eggs into groups while still in the liquid, in accordance with their vertical positions.

2. An apparatus for grading eggs comprising a deep receptacle adapted to contain liquid into which the eggs are placed and in which they sink to different vertically spaced zones and means for separately collecting the eggs in each zone.

3. An apparatus for grading eggs comprising a receptacle adapted to contain liquid into which the eggs are placed and in which they sink to different vertically spaced zones, means for gathering together the eggs in each zone, and means for removing the segregated eggs from the liquid.

4. The method of grading and preserving eggs, which comprises introducing the eggs into a body of preserving liquid, in which the eggs sink to different positions according to their specific gravities, maintaining the upper layer of the liquid hot, and separating the eggs into groups in accordance with their position in the liquid.

In testimony whereof, I have hereunto set my hand.

MORRIS KASSER.